United States Patent [19]

Ros

[11] Patent Number: 5,028,448
[45] Date of Patent: Jul. 2, 1991

[54] PROCESS FOR PREPARING AN EGG CONCENTRATE

[75] Inventor: Albert J. Ros, Harderwijk, Netherlands

[73] Assignee: B.V. Nederlandse Industrie Van Eiprodukten, Nunspeet, Netherlands

[21] Appl. No.: 528,547

[22] Filed: May 25, 1990

[51] Int. Cl.$^5$ .................................. A23L 1/32
[52] U.S. Cl. .................. 426/614; 426/330.1; 426/399; 426/521
[58] Field of Search ............. 426/614, 330.1, 399, 426/521

[56] References Cited

U.S. PATENT DOCUMENTS 3,409,446  11/1968  Van Olphen .................. 426/614
4,808,425  2/1989  Swartzel et al. ................ 426/614

*Primary Examiner*—Donald E. Czaja
*Assistant Examiner*—Leslie Wood
*Attorney, Agent, or Firm*—Oblon, Spivak, McClelland, Maier & Neustadt

[57] ABSTRACT

An egg concentrate comprising egg, sugar, glycerol, alginate and maltodextrin which has a long storage life time and is stable to sugar crystallization.

20 Claims, No Drawings

PROCESS FOR PREPARING AN EGG CONCENTRATE

BACKGROUND OF THE INVENTION

1. Field of the Invention

The invention relates to an egg-sugar concentrate which may be preserved and stored for long periods without deterioration and to a process for preparing the same.

2. Discussion of the Background

The present invention is directed to a method for preparing an egg concentrate which can be preserved and stored for long periods of time. Normally, egg concentrates have poor preservation properties and are, therefore, difficult to store in concentrated form for a long period of time without losing their original qualities of taste, smell, etc.

It has been proposed to preserve the egg concentrates by evaporating a mixture of eggs and glycerol to obtain a paste consistency (Netherlands Patent Specifications 20,929 and 48,365). The mixture may also contain, if desired, an acid salt.

U.S. Pat. No. 3,409,446 discloses a process for preparing egg concentrate which allows one to avoid the use of glycerol. Evaporation of egg concentrates containing glycerol is time consuming and may take from 2 to 3 days. Large amounts of glycerol are less desirable for human consumption, and are particularly undesirable for baking compositions.

U.S. Pat. No. 3,409,446 avoids the use of large amounts of glycerol by preparing an egg concentrate containing an effective amount of sugar, pasteurizing the mixture and then evaporating a major portion of the chemically unbound water under vacuum. While allowing one to avoid the use of large amounts of glycerol, this process has the disadvantage that the final product is not stable due to sugar crystallization. Heavy sediments of crystallized sugar may occur within a period of 1 to 3 months. The occurrence of crystallized sugar changes the structure of the product and reduces the possibility for use of the product in further processing. The egg/sugar product has a somewhat limited storage life of only about 3 months.

A need exists for an improved egg concentrate having a longer storage life time. Preferably, the egg concentrate should be stable and not subject to premature sugar crystallization.

SUMMARY OF THE INVENTION

Accordingly, one object of the present invention is to provide an egg concentrate and a process for preparing the same which overcomes the deficiencies of prior art concentrates.

This and other objects which will become apparent from the following specification have been achieved by the present egg concentrate which contains egg, sugar, glycerol, alginate and maltodextrin.

DETAILED DESCRIPTION OF THE PREFERRED EMBODIMENTS

It has been discovered that it is possible to improve the storage life time and prevent premature sugar crystallization by incorporating glycerol, alginate and maltodextrin into an egg concentrate containing egg and sugar. The addition of glycerol, alginate and maltodextrin improves the storage characteristics and shelf-life, reduces the growth of bacteria, yeast and molds and prevents sugar crystallization. The product of the present invention has a shelf life of up to 6 months to a year and even longer, substantially longer than prior egg concentrates.

In the present egg concentrates, hen eggs (liquid whole eggs) are combined with a sufficient amount of sugar to effectively decrease decomposition of the egg. The amount of sugar used is generally the same as the amounts in U.S. Pat. No. 3,409,446, incorporated herein by reference. Preferably, the egg and sugar are combined at a mixing ratio of approximately 0.5 parts by weight sugar per part of whole egg. That is, the ratio of egg mass to sugar is generally about 2.3:1 to about 1.8:1, and preferably approximately 2:1. In other words, the sugar is generally present in amounts of about 30 wt. % up to about 35 wt. % with amounts of about 33 wt. % being preferred. Obviously, egg mass:sugar ratios slightly above or below this ratio can also be utilized in the present invention.

The sugar which may be used in the present invention may be any sugar which performs the necessary preservative function when combined with the whole egg mass and which does not substantially crystallize in the present composition. The sugar may be a disaccharide such as sucrose, maltose, etc. or may be a monosaccharide such as glucose (dextrose) fructose, etc. The sugar may also contain a mixture of monosaccharides and disaccharides and optionally, higher saccharides such as trisaccharides, tetrasaccharides, etc. which generally occur as impurites in commerically available sugar compositions. A particularly preferred sugar is sucrose.

The maltodextrin used in the present invention comprises long chains of glucose residues. Maltodextrin products are available commercially. Maltodextrins are prepared by the hydrolysis of starch followed by drying of the hydrolysis product to produce the maltodextrin. Typically, maltodextrins prepared in this manner have a dextrose equivalent (D.E.) of from about 15-25, preferably about 20-22. Commercial maltodextrin products generally contain small amounts of dextrose, as well as lower oligosaccharides of dextrose, such as maltose and maltotriose. The presence of dextrose and lower oligosaccharides has no detrimental effect on the compositions of the present invention. Any other maltodextrins capable of preventing the crystallization of sugar may be used in the present invention.

The alginate of the present invention is derived from alginic acid, and generally occurs in the form of mixed salts of alginic acid, such as the sodium, calcium and magnesium salts. In general, other alkali, acid and water-soluble compounds including polysaccharides and chlorophyll are present in commercially available alginate preparations. Alginates are prepared by digesting seaweed with alkali to produce a dilute solution of alginate salts with insoluble matter in suspension. The alginate salts are then purified from the suspension. Most commerically available alginates are in the form of the sodium salt of alginic acid, with the remainder being mainly algininc acid, ammonium alginate and propylene glycol alginate. All of these can be used in the present invention. A particularly preferred alginate for use in the present invention is sodium alginate. Obviously, any suitable alginate composition capable of preventing the crystallization of sugar compositions may be used.

Glycerol is well known and commercially available. Any glycerol having a purity sufficient for use in food products may be used in the present invention.

The egg concentrate product of the present invention is prepared by first shelling hen eggs to obtain a liquid whole egg product which is then pasteurized. The pasteurized whole egg product can then be stored or used directly to prepare the egg concentrate of the present invention. The liquid whole egg product is preheated, generally to about 60-75° C. over a period of several minutes to half an hour and then the sugar is added to the warmed whole egg to produce an egg/sugar mixture.

To the egg/sugar mixture is added an effective amount of glycerol, alginate and maltodextrin in any order of addition, with further mixing to prevent sugar crystallization, increase storage time and prevent growth of microorganisms. The amount of alginate added to the egg/sugar mixture is generally about 0.01-0.20 wt. %, preferably about 0.03-0.10 wt. % based on the egg/sugar mixture, most preferably about 0.05 wt. %. Glycerol and maltodextrin are generally added in amounts ranging from about 0.1-1.0 wt. %, preferably about 0.2-0.6 wt. %, most preferably about 0.4 wt. %, individually, based on the weight of the egg/sugar mixture. If desired, the maltodextrin and alginate may first be dissolved in water and added to the egg/sugar mixture as a solution of alginate and maltodextrin. The concentration of alginate and maltodextrin in the aqueous solution is not critical. Glycerol may be added to the solution of alginate and maltodextrin and all three ingredients then added to the egg/sugar mixture, or alternatively, the glycerol may be added directly to the egg/sugar mixture.

After addition of the glycerol, alginate and maltodextrin to the egg/sugar mixture, the final mixture is then pasteurized at temperatures ranging from about 65 to 75° C., preferably about 67-72° C. and then is subjected to evaporation in a conventional vacuum evaporator. Preferably, a thin layer vacuum evaporator is used in which evaporation takes place from a thin layer of liquid which is in contact with a heat exchange surface. Evaporation is carried out so as to remove a major portion of the unbound water but not the chemically bound water.

When the mixture is exposed to the higher temperatures of 65-75° C., pasteurization occurs over a period of about 3-20 minutes killing pathogenic microorganisms, such as bacteria. The time and temperature used for pasteurization are inversely related. That is, when higher temperatures are used, pasteurization may be conducted for shorter periods of time, and conversely, when lower temperatures are used, longer times are required to obtain adequate pasteurization. Obviously, temperatures above 75° C. may be used if one uses a correspondingly shorter period of time. Likewise, pasteurization temperatures lower than 65° C. may be used if one uses longer pasteurization times. For optimum processing, pasteurization temperatures of about 75° C. for about 3.5 minutes are satisfactory.

The pasteurization process does not effect the water chemically bound to the albumin protein so that the quality of albumin and the other constituents of the egg are maintained, particularly with respect to foaming and coagulation properties useful in baking.

The mixture is generally placed in the vacuum evaporator at a temperature of about 60-75° C. following pasteurization. Very quickly, evaporation of the free and uncombined water provides a solid concentration ranging from about 50 to 75%. The temperature used in the evaporation is generally held constant throughout the evaporation process, but may be varied to achieve different rates of evaporation and solids content of the mixture.

The appearance of the egg concentrate after pasteurization and evaporation is a transparent thick liquid. The sugar, glycerol, alginate and maltodextrin are uniformly distributed throughout the concentrate during the process of mixing and evaporation. The addition of glycerol to the egg concentrate increases the shelf life and further prohibits the growth of bacteria, yeast and mold since the water activity of the final product is substantially lower relative to simple egg/sugar concentrates such as those of U.S. Pat. No. 3,409,446.

The addition of alginate and maltodextrin stabilizes the sugar distributed throughout the product thereby maintaining stable storage conditions and preventing sugar crystallization. Storage times of over a year are possible with the present product in contrast to simple egg/sugar mixtures in which sediments of crystallized sugar occur within a period of 1-3 months.

It is possible to further extend the shelf life and storage capability of the egg concentrate of the present invention to times of 1-2 years and longer by conventional hot-filling of the final liquid product into containers in the absence of air and sealing the container. Hot-filling may be performed under vacuum conditions with vacuum sealing of the final container or hot-filling may be conducted using a stream of an inert gas such as nitrogen to exclude oxygen from the final container. Hot-filling of the egg concentrate provides an excellent product having a very long shelf life. The taste, smell and outward appearance of the final product are substantially unaltered even after these long storage times.

The present egg concentrate is superior to known egg concentrates by having a substantially longer storage time, reduced susceptibility to the growth of bacteria, yeast and molds and substantially increased stability without sugar crystallization. The present products do not require additional preserving agents such as potassium sorbate or sodium benzoate, although these additional conventional preservative agents may be added if desired.

The egg concentrate of the present invention may be used as a raw material in conventional cooking and baking processes which require the presence of both egg and sugar or as an additive to food products such as milk, etc.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by letters patent of the U.S. is:

1. An egg concentrate, consisting essentially of egg and an amount of sugar effective to decrease decomposition of said egg; glycerol, alginate and maltodextrin, in amounts sufficient to substantially prevent crystallization of said sugar.

2. The concentrate of claim 1, wherein said egg and sugar are present in a weight ratio of about 2.3:1 to about 1.8:1.

3. The concentrate of claim 1, wherein said glycerol is present in an amount of about 0.1-1.0 wt. %.

4. The concentrate of claim 1, wherein said glycerol is present in an amount of 0.2-0.6 wt. %.

5. The concentrate of claim 1, wherein said glycerol is present in an amount of about 0.4 wt. %.

6. The concentrate of claim 1, wherein said alginate is present in an amount of about 0.01-0.20 wt. %.

7. The concentrate of claim 1, wherein said alginate is present in an amount of 0.03-0.10 wt. %.

8. The concentrate of claim 1, wherein said alginate is present in an amount of about 0.05 wt. %.

9. The concentrate of claim 1, wherein said maltodextrin is present in an amount of about 0.1-1.0 wt. %.

10. The concentrate of claim 1, wherein said maltodextrin is present in an amount of about 0.2-0.6 wt. %.

11. The concentrate of claim 1, wherein said maltodextrin is present in an amount of about 0.4 wt. %.

12. The concentrate of claim 2, wherein the ratio of egg:sugar is about 2:1.

13. A process for preparing the egg concentrate of claim 1, which comprises preparing a mixture consisting essentially of egg, sugar, glycerol, alginate and maltodextrin by mixing egg with an effective amount of sugar, glycerol, alginate and maltodextrin, pasteurizing and the evaporating from said mixture a major portion of the chemically unbound water at a temperature of about 60-75° C. under a vacuum.

14. The process of claim 13, wherein said mixture is pasteurized at a temperature of about 65-75° C.

15. The process of claim 13, wherein the ratio of egg:sugar is about 2.3:1 to about 1.8:1.

16. The process of claim 13, wherein said mixture comprises 0.1-1.0 wt. % glycerol.

17. The process of claim 13, wherein said mixture comprises about 0.01-0.20 wt. % alginate.

18. The process of claim 13, wherein said mixture comprises about 0.1-1.0 wt. % maltodextrin.

19. The process of claim 13, wherein said evaporation is conducted in a thin-layer vacuum evaporator.

20. The process of claim 13, wherein said mixture is evaporated to a solids content of about 50-75%.

* * * * *